US012625560B2

(12) United States Patent
Wang et al.

(10) Patent No.: US 12,625,560 B2
(45) Date of Patent: May 12, 2026

(54) INTERACTION METHOD AND APPARATUS FOR LIGHT FIELD DISPLAY, AND LIGHT FIELD DISPLAY SYSTEM

(71) Applicant: BOE Technology Group Co., Ltd., Beijing (CN)

(72) Inventors: Xuefeng Wang, Beijing (CN); Hao Zhang, Beijing (CN); Jinghua Miao, Beijing (CN); Qingwen Fan, Beijing (CN); Lili Chen, Beijing (CN)

(73) Assignee: BOE TECHNOLOGY GROUP CO. , LTD., Beijing (CN)

( * ) Notice: Subject to any disclaimer, the term of this patent is extended or adjusted under 35 U.S.C. 154(b) by 0 days.

(21) Appl. No.: 18/864,069

(22) PCT Filed: May 16, 2023

(86) PCT No.: PCT/CN2023/094572
§ 371 (c)(1),
(2) Date: Nov. 8, 2024

(87) PCT Pub. No.: WO2023/246381
PCT Pub. Date: Dec. 28, 2023

(65) Prior Publication Data

US 2025/0315108 A1       Oct. 9, 2025

(30) Foreign Application Priority Data

Jun. 22, 2022     (CN) ........................ 202210713570.X

(51) Int. Cl.
*G06F 3/01*          (2006.01)
*G06F 3/04815*     (2022.01)
(Continued)

(52) U.S. Cl.
CPC .......... *G06F 3/017* (2013.01); *G06F 3/04815* (2013.01); *H04N 13/366* (2018.05); *H04N 13/398* (2018.05)

(58) Field of Classification Search
CPC ... G06F 3/017; G06F 3/04815; H04N 13/366; H04N 13/398
See application file for complete search history.

(56) References Cited

U.S. PATENT DOCUMENTS

2014/0198049 A1* 7/2014 Xue ........................ G06F 1/169
                                                                            345/168
2017/0235372 A1* 8/2017 Song .................... G03H 1/2286
                                                                            345/158

FOREIGN PATENT DOCUMENTS

CN          101344816 A      1/2009
CN          105204644 A      12/2015
(Continued)

OTHER PUBLICATIONS

International Search Report mailed on Jun. 23, 2023, received for PCT Application PCT/CN2023/094572, filed on May 16, 2023, 4 pages including English Translation.
(Continued)

*Primary Examiner* — David D Davis
(74) *Attorney, Agent, or Firm* — XSENSUS LLP

(57) ABSTRACT

Provided in the present invention are an interaction method and apparatus for a light field display, and a light field display system. The method includes: establishing a virtual object on a three-dimensional interaction interface, which is displayed by a target light field display, so as to map an interaction gesture of a user for the three-dimensional interaction interface; identifying the interaction gesture of the user for the three-dimensional interaction interface, and mapping the interaction gesture to the virtual object, so as to perform, on a target object in the three-dimensional inter-
(Continued)

creating a virtual object on a stereoscopic interactive interface displayed by a target light field display to map a user's interactive gesture on the stereoscopic interactive interface ⟍ S101 performing an interactive operation corresponding to the interactive gesture on a target object in the stereoscopic interactive interface, by recognizing the user's interactive gesture for the stereoscopic interactive interface and mapping the interactive gesture to the virtual object ⟍ S102 adjusting a display content of the stereoscopic interactive interface based on the interactive operation ⟍ S103 action interface, an interaction operation corresponding to the interaction gesture; and adjusting the display content of the three-dimensional interaction interface on the basis of the interaction operation.

17 Claims, 13 Drawing Sheets

(51) Int. Cl.
H04N 13/366          (2018.01)
H04N 13/398          (2018.01)

(56)                    References Cited

FOREIGN PATENT DOCUMENTS

| | | | |
|---|---|---|---|
| CN | 105980965 A | 9/2016 | |
| CN | 106774938 A | 5/2017 | |
| CN | 110568929 A | 12/2019 | |
| CN | 109547753 B | 11/2020 | |
| CN | 113986093 A | 1/2022 | |
| CN | 114546103 A | 5/2022 | |
| EP | 4439245 A1 * | 10/2024 | ........... G06F 3/0346 |

OTHER PUBLICATIONS

Written Opinion mailed on Jun. 23, 2023, received for PCT Application PCT/CN2023/094572, filed on May 16, 2023, 8 pages including English Translation.

* cited by examiner creating a virtual object on a stereoscopic interactive interface displayed by a target light field display to map a user's interactive gesture on the stereoscopic interactive interface ~S101 performing an interactive operation corresponding to the interactive gesture on a target object in the stereoscopic interactive interface, by recognizing the user's interactive gesture for the stereoscopic interactive interface and mapping the interactive gesture to the virtual object ~S102 adjusting a display content of the stereoscopic interactive interface based on the interactive operation ~S103

FIG. 1

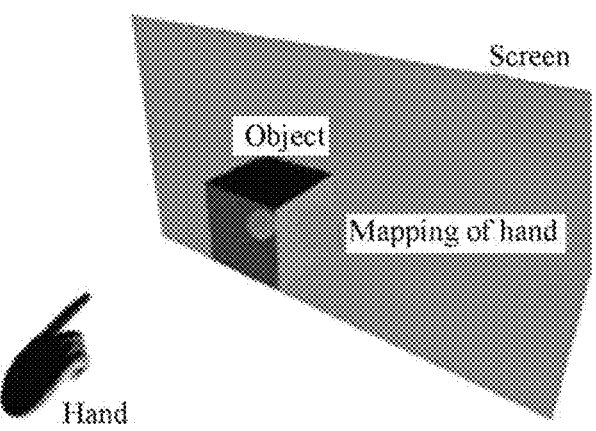

FIG. 2a

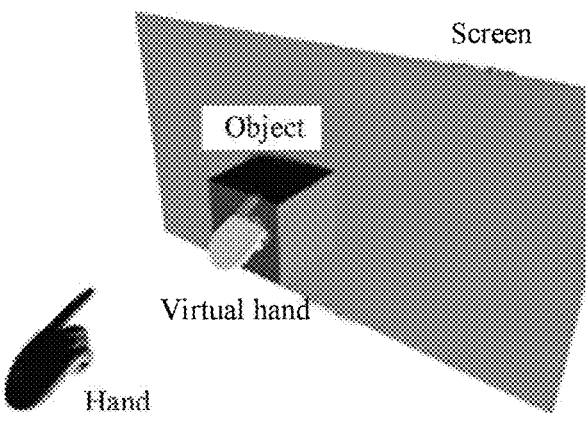

FIG. 2b

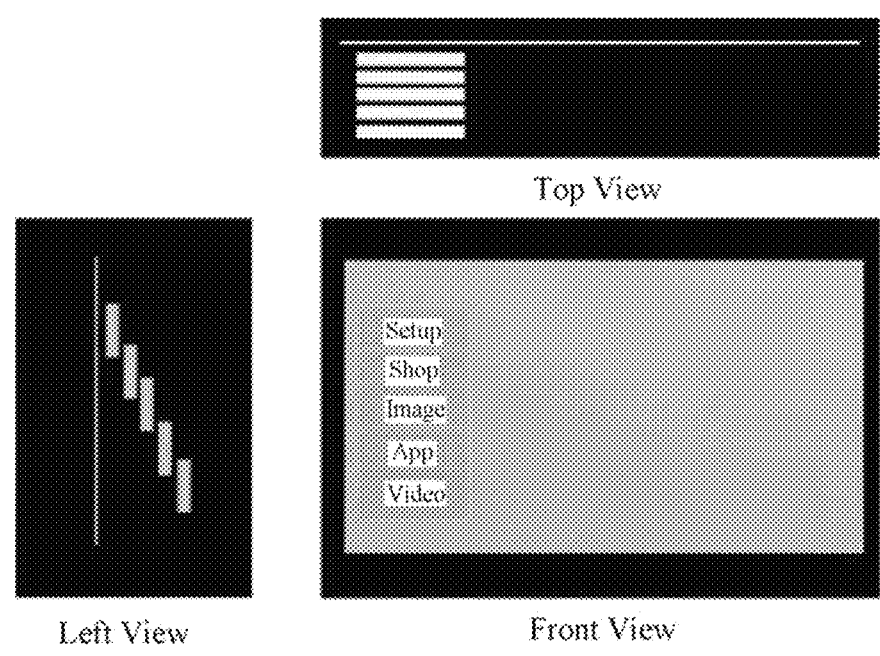
Top View
Left View Front View
FIG. 7a
Top View
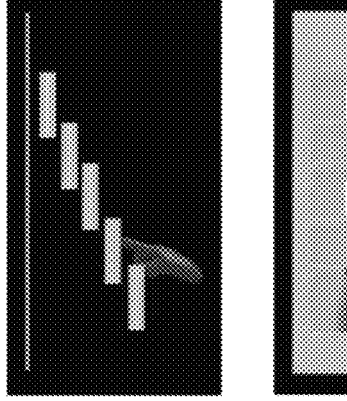 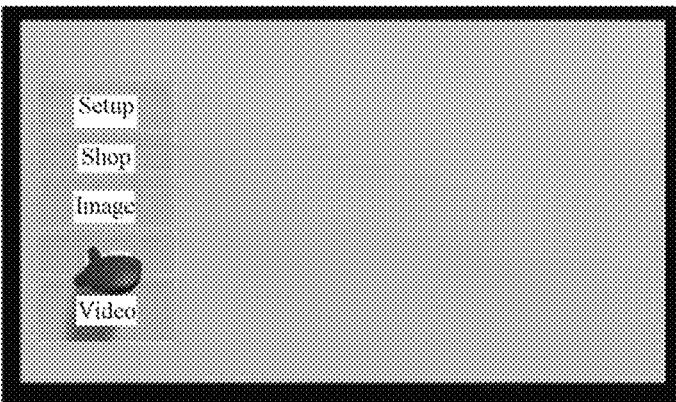
Left View Front View
FIG. 7b

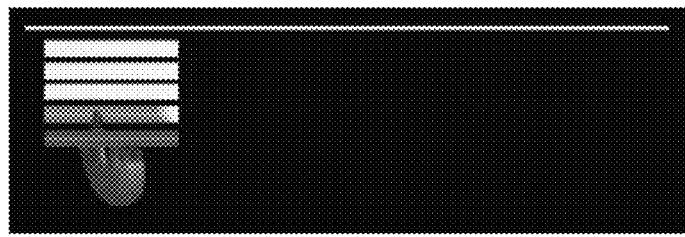
Top View
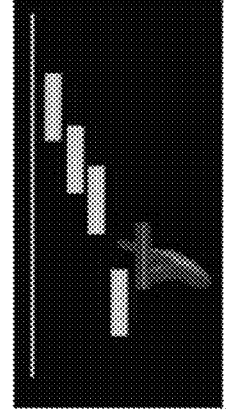
Left View
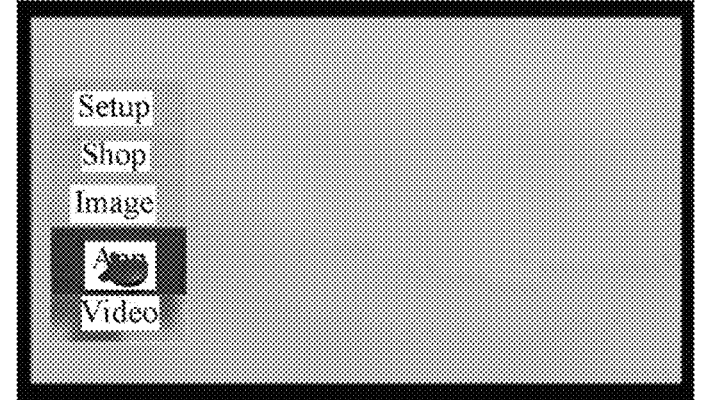
Front View
FIG. 7c
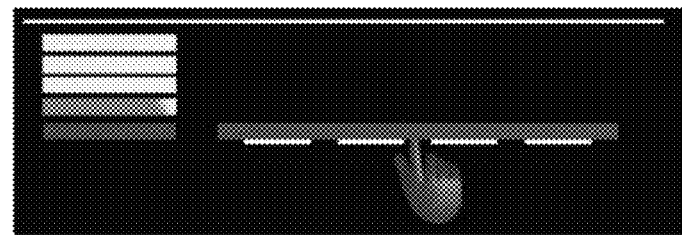
Top View
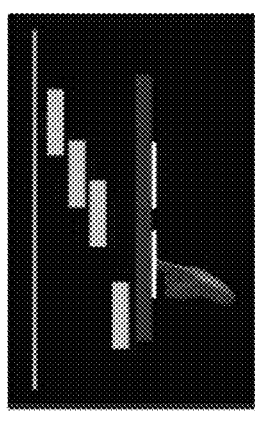
Left View
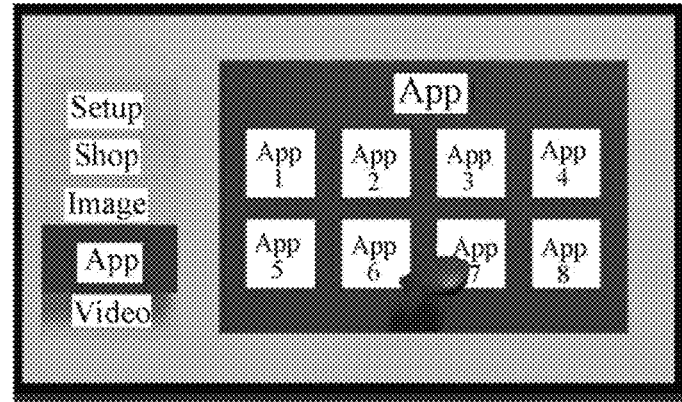
Front View
FIG. 8a

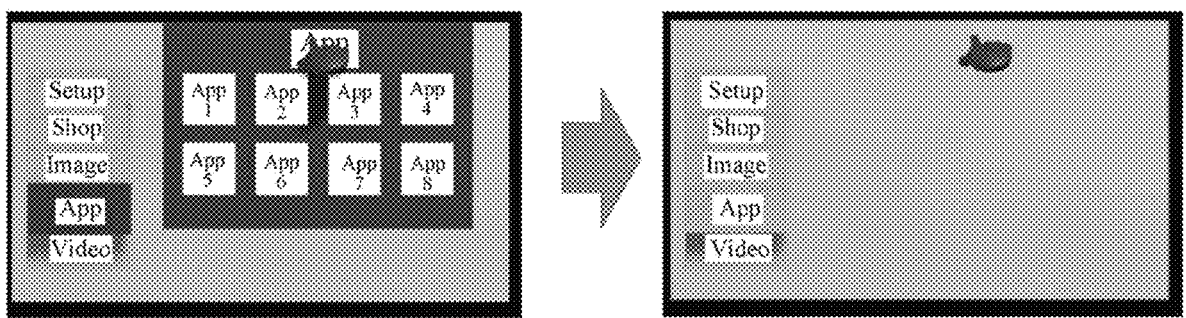
FIG. 8b
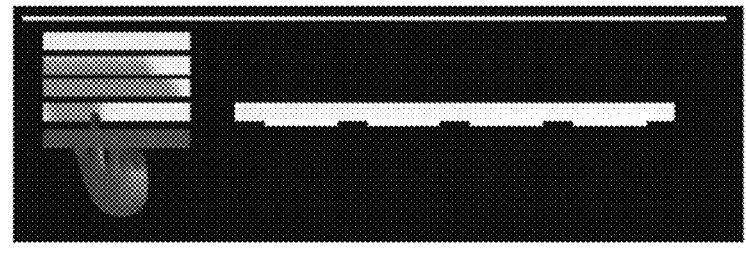
Top View
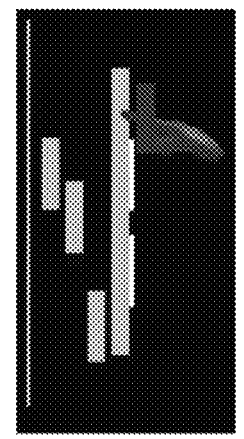
Left View
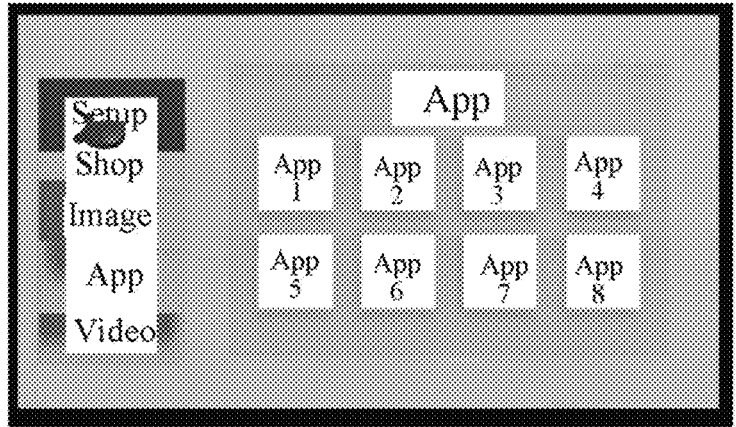
Front View
FIG. 8c

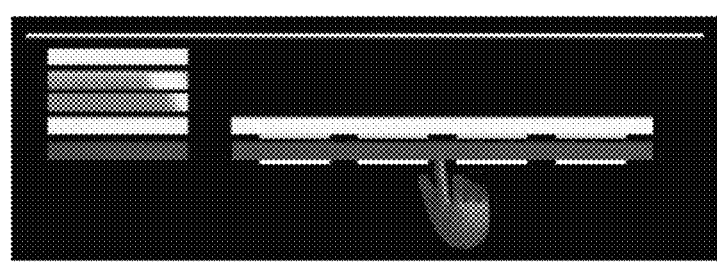
Top View
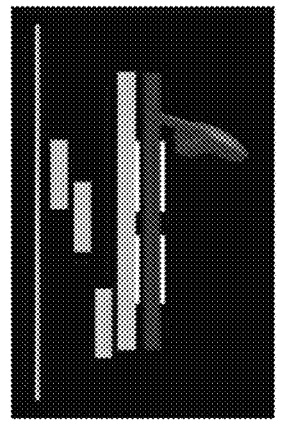
Left View
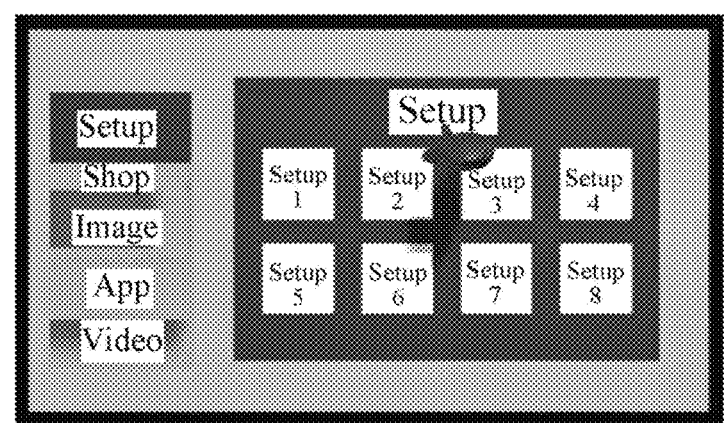
Front View
FIG. 8d
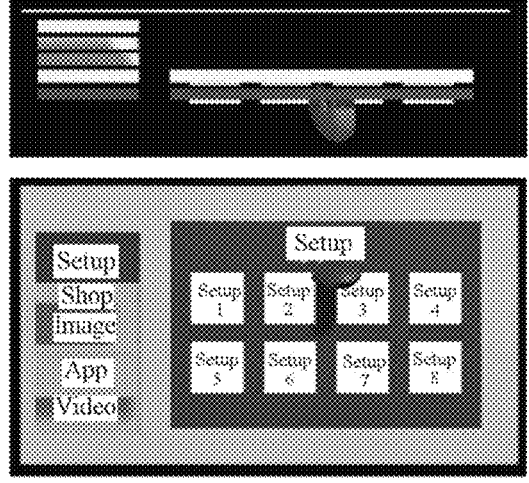
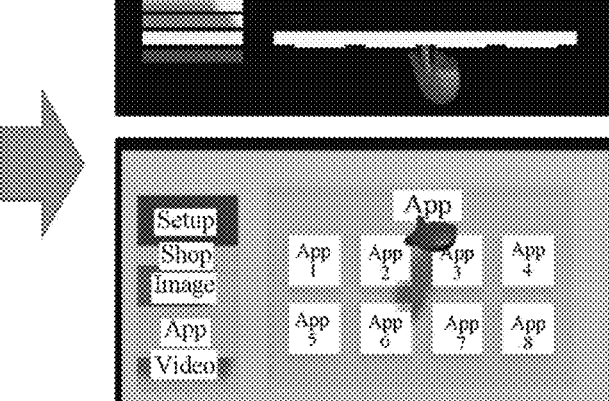
FIG. 8e

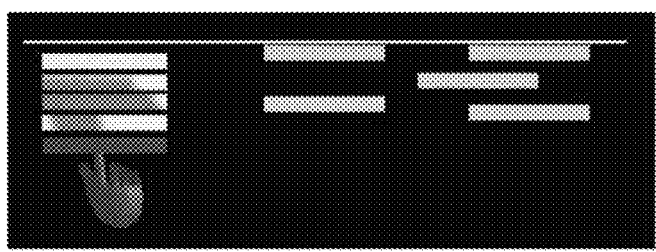
Top View
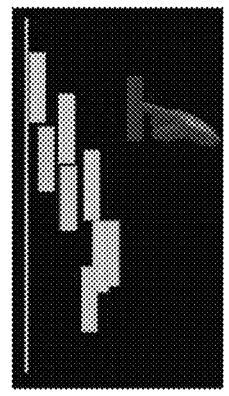
Left View
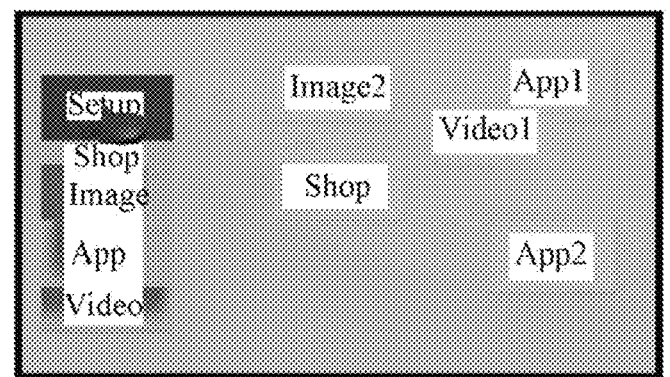
Front View
FIG. 10a
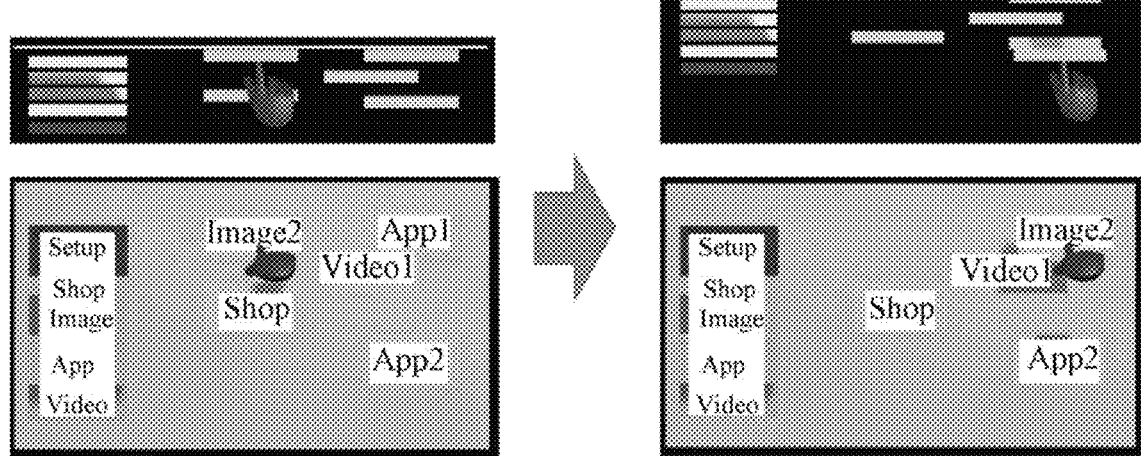
FIG. 10b
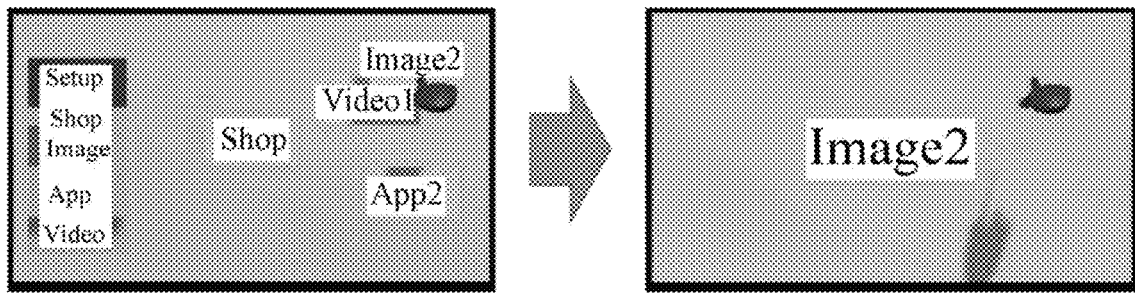
FIG. 10c

INTERACTION METHOD AND APPARATUS FOR LIGHT FIELD DISPLAY, AND LIGHT FIELD DISPLAY SYSTEM

CROSS-REFERENCE TO RELATED APPLICATIONS

The present application is a national phase application of International Application No. PCT/CN2023/094572, filed on May 16, 2023, which claims priority from the Chinese application No. 202210713570.X, filed on Jun. 22, 2022 and entitled "INTERACTION METHOD AND APPARATUS FOR LIGHT FIELD DISPLAY, AND LIGHT FIELD DISPLAY SYSTEM", and the entire contents thereof are incorporated herein by reference.

TECHNICAL FIELD

The present disclosure relates to the field of 3D display technology, and in particular to an interaction method and device for a light field display, and a light field display system.

BACKGROUND

With the advancement of display technology, people are no longer satisfied with watching 2D content, and 3D light field displays have emerged.

It should be noted that, information disclosed in the above background portion is provided only for better understanding of the background of the present disclosure, and thus it may contain information that does not form the prior art known by those ordinary skilled in the art.

SUMMARY

The purpose of the present disclosure is to provide an interactive solution suitable for a 3D light field display.

In a first aspect, an embodiment of the present disclosure provides an interactive method for a light field display, including:

creating a virtual object on a stereoscopic interactive interface displayed by a target light field display to map a user's interactive gesture on the stereoscopic interactive interface;

performing an interactive operation corresponding to the interactive gesture on a target object in the stereoscopic interactive interface, by recognizing the user's interactive gesture for the stereoscopic interactive interface and mapping the interactive gesture to the virtual object; and adjusting a display content of the stereoscopic interactive interface based on the interactive operation.

In some implementations, the virtual objection includes a virtual item, and the performing the interactive operation corresponding to the interactive gesture on the target object in the stereoscopic interactive interface, by recognizing the user's interactive gesture for the stereoscopic interactive interface and mapping the interactive gesture to the virtual object includes:

recognizing the user's interactive gesture on the stereoscopic interactive interface based on a convex hull detection algorithm; and mapping the interaction gesture to the virtual item by mapping a first position of a hand to a position of the virtual item based on a type of the interaction gesture, wherein the type of the interaction gesture is associated with the first position of the hand.

In some implementations, the type of the interactive gesture including an open hand or a clenched fist, the first position includes a palm center, and mapping the first position of the hand to the position of the virtual item based on the type of the interactive gesture includes:

mapping a coordinate of the palm center to a coordinate of a center point of the virtual item.

In some implementations, the type of the interactive gesture includes a single finger gesture, the first position includes a fingertip of the single finger, and the mapping first position of the hand to the position of the virtual item based on the type of the interactive gesture includes:

mapping a coordinate of the fingertip of the single finger to a coordinate of a center point of the virtual item.

In some implementations, the virtual object includes a virtual hand model, and the performing the interactive operation corresponding to the interactive gesture on the target object in the stereoscopic interactive interface, by recognizing the user's interactive gesture for the stereoscopic interactive interface and mapping the interactive gesture to the virtual object includes:

recognizing the user's interactive gesture on the stereoscopic interactive interface based on a joint detection algorithm; and mapping the interaction gesture to the virtual hand model by mapping a coordinate of each joint position corresponding to the interactive gesture to a coordinate of each joint position of the virtual hand model.

In some implementations, the light field display includes an image acquisition device for acquiring the interactive gesture, and an installation position of the image acquisition device is determined according to an optimal viewing distance of the light field display; and when mapping the interactive gesture to the virtual object, a coordinate mapping is performed according to the installation position of the image acquisition device and a corresponding coordinate transformation formula.

In some implementations, the light field display includes a light field display whose optimal viewing distance exceeds a preset distance, and the image acquisition device is installed at a top of the light field display; and when mapping the interactive gesture to the virtual object, the coordinate mapping is performed according to a first coordinate transformation formula; and the first coordinate transformation formula includes:

$$x_n = x_1$$
$$y_n = h + y_1 * \cos\alpha - z_1 * \sin\alpha$$
$$z_n = y_1 * \sin\alpha + z_1 * \cos\alpha$$

wherein, $(x_n, y_n, z_n)$ represent the coordinate of the virtual object, h represents the height of the light field display, $(x_1, y_1, z_1)$ represent the coordinate of the interactive gesture, and $\alpha$ represents an angle between a right ahead direction of the image acquisition device and a horizontal direction.

In some implementations, the light field display includes a light field display whose optimal viewing distance does not exceed a preset distance, and the image acquisition device is installed at a bottom of the light field display;

when mapping the interactive gesture to the virtual object, the coordinate mapping is performed according to a second coordinate transformation formula; the second coordinate transformation formula includes:

$$x_n = x_2$$
$$y_n = y_2 * \cos\beta + z_2 * \sin\beta$$
$$z_n = -y_2 * \sin\beta + z_2 * \cos\beta$$

wherein, $(x_n, y_n, z_n)$ represent the coordinate of the virtual object, $(x_2, y_2, z_2)$ represent the coordinate of the interactive gesture, and $\beta$ represents an angle between a right ahead direction of the image acquisition device and a horizontal direction.

In some implementations, the interactive gesture includes a single finger gesture; and the performing the interactive operation corresponding to the interactive gesture on the target object in the stereoscopic interactive interface includes:

detecting a duration of the single finger gesture touching the target object in the stereoscopic interactive interface;

determining whether the duration reaches a preset duration;

in a case that the duration reaches a preset duration, determining that the interaction operation corresponding to the single finger gesture is a long press operation; and in a case that the duration does not reach the preset duration, determining that the interaction operation corresponding to the single finger gesture is a click operation.

In some implementations, the target object includes a first-level menu item, the stereoscopic interactive interface includes at least one first-level menu item, and the at least one first-level menu item is displayed in a first preset area of the stereoscopic interactive interface according to a preset spatial display stack order;

the adjusting the display content of the stereoscopic interactive interface based on the interactive operation includes:

in response to a click operation on a first first-level menu item, adjusting a spatial display level of the first first-level menu item to a highest spatial display level, and/or adjusting a display color of the first first-level menu item;

wherein the highest spatial display level is a spatial display level closest to the user.

In some implementations, the target object includes a first-level menu item, the stereoscopic interactive interface includes at least one first-level menu item, and the at least one first-level menu item is displayed in a first preset area of the stereoscopic interactive interface according to a preset spatial display stack order, and the interactive operation further includes a grab operation;

the adjusting the display content of the stereoscopic interactive interface based on the interactive operation includes:

moving a second first-level menu item based on a grab operation on the second first-level menu item, generating a second second-level menu display area corresponding to the second first-level menu item, and displaying the second second-level menu display area in a second preset area of the stereoscopic interactive interface at the highest spatial display level;

wherein the highest spatial display level is a spatial display level closest to the user.

In some implementations, the adjusting the display content of the stereoscopic interactive interface based on the interactive operation further includes:

moving the second second-level menu display area to a third preset area of the stereoscopic interactive interface to close the second second-level menu display area, based on a grab operation on the second second-level menu display area.

In some implementations, the adjusting the display content of the stereoscopic interactive interface based on the interactive operation further includes:

in a case that the second second-level menu display area is displayed in the second preset area of the stereoscopic interactive interface, in response to a click operation on a third first-level menu item, adjusting the spatial display level of the third first-level menu item to the highest spatial display level, and/or adjusting the display color of the third first-level menu item; and based on a grab operation on the third first-level menu item, moving the third first-level menu item and generating a third second-level menu display area corresponding to the third first-level menu item, and displaying the third second-level menu display area in a third preset area of the stereoscopic interactive interface at the highest spatial display level.

In some implementations, the adjusting the display content of the stereoscopic interactive interface based on the interactive operation further includes:

in response to the virtual object moving away from the user, hiding the third and second-level menu display areas, and displaying a second-level menu display areas of a next lower level; and in response to the virtual object moving toward the user, displaying the hidden third second-level menu display areas again.

In some implementations, the adjusting the display content of the stereoscopic interactive interface based on the interactive operation further includes:

in response to a click operation on any second-level menu item in the second second-level menu display area, displaying an interface corresponding to the second-level menu item in full screen mode;

in the full-screen state, in response to a long press operation on the first preset area of the stereoscopic interactive interface, restoring display of the first-level menu items hidden under the interface displayed in the full-screen mode; and in response to a click operation on any first-level menu item, displaying the interface displayed in full screen mode in thumbnail mode.

In some implementations, the adjusting the display content of the stereoscopic interactive interface based on the interactive operation further includes:

moving any thumbnail based on a grab operation to change a display position of the thumbnail; or, in response to moving any thumbnail to a third preset area of the stereoscopic interactive interface through a grab operation, closing the thumbnail; or, in response to a long press operation on any thumbnail, generating an operation option for the thumbnail; or, in response to the virtual object penetrating any thumbnail in a direction away from the user, hiding the thumbnail; and in response to the virtual object moving in a direction close to the user to leave the thumbnail, restoring display of the thumbnail.

In a second aspect, an embodiment of the present disclosure provides an interactive device for light field display, including:

a creation module, configured to a virtual object on a stereoscopic interactive interface displayed by a target light field display to map a user's interactive gesture on the stereoscopic interactive interface;

a mapping module, configured to perform an interactive operation corresponding to the interactive gesture on a target object in the stereoscopic interactive interface, by recognizing the user's interactive gesture for the stereoscopic interactive interface and mapping the interactive gesture to the virtual object; and an adjustment module, configured to adjust a display content of the stereoscopic interactive interface based on the interactive operation.

In a third aspect, an embodiment of the present disclosure provides a computer storage medium, wherein a computer program is stored on the computer-readable storage medium, and when the computer program is executed by one or more processors, the interactive method for light field display according to the first aspect is implemented.

In a fourth aspect, an embodiment of the present disclosure provides a light field display, including a memory and one or more processors, wherein a computer program is stored in the memory, and when the computer program is executed by the one or more processors, the interactive method for light field display according to the first aspect is implemented.

In a fifth aspect, an embodiment of the present disclosure provides a light field display system, including:

the light field display according to the fourth aspect; and an image acquisition device, connected to the light field display and is configured to acquire an interactive gesture.

In some implementations, in a case that the light field display is a light field display with an optimal viewing distance exceeding a preset distance, the image acquisition device is installed at a top of the light field display, and a longitudinal field angle of the image acquisition device is set in a range of 90° to 120°, and an angle between a right ahead direction of the image acquisition device and a horizontal direction is set in a range of 45° to 60°; and in a case that the light field display is a light field display whose optimal viewing distance does not exceed a preset distance, the image acquisition device is installed at a bottom of the light field display, the longitudinal field angle of the image acquisition device is set in a range of 60° to 90°, and the angle between the right ahead direction of the image acquisition device and the horizontal direction is set by the following relationship:

$$\alpha = 90° - \frac{fov}{2} - \arctan\frac{l}{h}$$

wherein, h represents a height of the light field display, α represents the angle between the right ahead direction of the image acquisition device and the horizontal direction, fov represents the longitudinal field of view of the image acquisition device, and l represents the optimal viewing distance.

One or more embodiments of the present disclosure can bring at least the following beneficial effects:

According to the present disclosure, a virtual object is created on a stereoscopic interactive interface displayed by a target light field display to map the user's interactive gestures for the stereoscopic interactive interface; the user's interactive gestures for the stereoscopic interactive interface is recognized, and the interactive gestures is mapped to the virtual object to perform the interactive operation corresponding to the interactive gesture on the target object in the stereoscopic interactive interface; and the display content of the stereoscopic interactive interface is adjusted based on the interactive operation. Through this interactive solution suitable for 3D light field displays, when displaying a stereoscopic interactive interface, the user can accurately and efficiently perform interactive operations with objects in the stereoscopic interactive interface, thereby improving the user's interactive experience.

It is to be understood that both the foregoing general description and the following detailed description are exemplary and explanatory only and are not restrictive of the present disclosure.

BRIEF DESCRIPTION OF THE DRAWINGS

In order to more clearly illustrate the technical solutions of the embodiments of the present disclosure, the drawings required for use in the embodiments will be briefly introduced below. It should be understood that the following drawings only show certain embodiments of the present disclosure and should not be regarded as limiting the scope.

FIG. 1 is a flow chart of an interactive method for a light field display provided by an embodiment of the present disclosure;

FIG. 2a is an example of a virtual item provided by an embodiment of the present disclosure;

FIG. 2b is an example of a virtual hand model provided by an embodiment of the present disclosure;

FIG. 4a is a schematic diagram of the coverage area of the longitudinal field of view FOV corresponding to FIG. 3a;

FIG. 5a is a schematic diagram of coordinate system transformation corresponding to FIG. 3a;

FIG. 7a is a display schematic diagram of an interactive interface system provided by an embodiment of the present disclosure;

FIG. 7b is a schematic diagram of a virtual hand model according to an embodiment of the present disclosure performing a click operation on a first-level menu item;

FIG. 7c is a schematic diagram showing the display of a first-level menu item after a click operation is performed on the first-level menu item according to an embodiment of the present disclosure;

FIG. 8a is a schematic diagram of generating a second-level menu display area provided by an embodiment of the present disclosure;

FIG. 8b is a schematic diagram of closing the second-level menu display area provided by an embodiment of the present disclosure;

FIG. 8c is a schematic diagram of a second-level menu item display area switched to an inactive state according to an embodiment of the present disclosure;

FIG. 8d is a schematic diagram of generating a second-level menu display area provided by an embodiment of the present disclosure;

FIG. 8e is a schematic diagram of hiding the second-level menu display area provided by an embodiment of the present disclosure;

FIG. 10a is a schematic diagram of a plurality of thumbnails existing simultaneously provided by an embodiment of the present disclosure;

FIG. 10b is a schematic diagram of moving a thumbnail through a grab operation provided by an embodiment of the present disclosure;

FIG. 10c is a schematic diagram of activating an application by a click operation provided by an embodiment of the present disclosure;

DETAILED DESCRIPTION

Figure 3A:
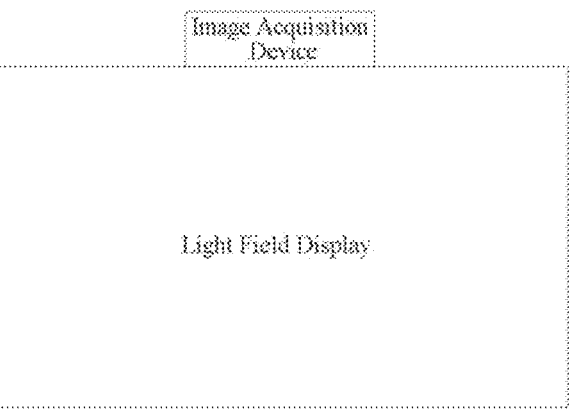
FIG. 3a is a schematic diagram of installing an image acquisition device at the top of a light field display provided by an embodiment of the present disclosure.

Hereinafter, the technical solutions in the embodiments of the present disclosure will be clearly and completely described in conjunction with the drawings in the embodiments of the present disclosure. Obviously, the described embodiments are only a part of the embodiments of the present disclosure, rather than all the embodiments. The components of the embodiments of the present disclosure generally described and shown in the drawings here can be arranged and designed in various different configurations. Therefore, the following detailed description of the embodiments of the present disclosure provided in the drawings is not intended to limit the scope of the claimed invention, but merely represents the selected embodiments of the present disclosure. Based on the embodiments of the present disclosure, all other embodiments obtained by those skilled in the art without making creative effort belong to the scope of protection of the present disclosure.

In a light field display, the system interface changes from a flat interface to a stereoscopic interface in space, and the operation input also changes from traditional keyboard and mouse operation or touch screen operation to operation in space. Therefore, the operation interface and the corresponding display solution need to be changed accordingly.

Embodiment 1

FIG. 1 shows a flow chart of an interaction method for a light field display. As shown in FIG. 1, the interaction method for a light field display provided in this embodiment includes steps S101 to S103:

Step S101: creating a virtual object on a stereoscopic interactive interface displayed by a target light field display to map a user's interactive gesture on the stereoscopic interactive interface.

Step S102: identifying the user's interactive gestures on the stereoscopic interactive interface, and mapping the interactive gestures to virtual objects, so as to perform interactive operations corresponding to the interactive gestures on the target objects in the stereoscopic interactive interface.

Step S103: adjusting the display content of the stereoscopic interactive interface based on the interactive operation.

In this embodiment, a virtual object is established on the stereoscopic interactive interface displayed by a target light field display to map the user's interactive gestures with respect to the stereoscopic interactive interface. During the interaction process, the user's interactive gestures with respect to the stereoscopic interactive interface are identified and mapped to the virtual object, so that the interactive operation corresponding to the interactive gesture is performed on the target object in the stereoscopic interactive interface. Then, the display content of the stereoscopic interactive interface is adjusted based on the interactive operation, thereby realizing the interactive operation and display of the stereoscopic interactive interface between the user and the light field display.

In practical applications, there may be two possible relationships between users and light field displays:

One is the case where the size of the light field display is relatively small, such as a light field display used on a desktop. In this case, the distance between the person and the screen of the light field display is relatively close, and the person's hands can directly touch the stereoscopic objects of the virtual reality displayed by the light field display. In a specific example, the optimal viewing distance of a light field display used on a desktop is 500 mm, and the supported screen-out distance is 50 mm. The arm length of an adult is about 600 mm. When the viewer stands at the optimal viewing distance, the objects at the screen-out position displayed by the light field display can be touched in the interactive vision of the person. In this case, the viewer can directly make spatial viewing judgments based on the real hand position and the position of the displayed virtual item, and thus interact therewith, without the need to map virtual objects to assist the viewer in judging whether to generate interactive operations such as clicks/long presses/collisions.

The other is the case where the size of the light field display is relatively large, such as a vertical type light field display. The distance between the person and the screen of the light field display is relatively far, and the person's hands cannot directly touch the virtual reality three-dimensional objects displayed by the light field display. In a specific example, the optimal viewing distance of a vertical light field display is 2 m~7 m, or even greater. In this case, the length of a person's arm is not enough to achieve direct contact between the hand and the off-screen object presented by the light field display, which requires mapping a virtual object to assist the viewer in determining whether to generate click/long press/collision and other operations. One application scenario of this embodiment is for such a vertical type large-size light field display.

In this embodiment, a virtual object is created on the stereoscopic interactive interface displayed by the target light field display to map the interactive gestures made by the hand. In some cases, the virtual object can be a virtual item such as a virtual sphere, as shown in FIG. 2a, a virtual sphere is used as a mapping of the hand, and when an interactive gesture is recognized, it is mapped to the object of the stereoscopic interactive interface displayed by the target light field display, and the position of the virtual sphere represents the mapping position of the interactive gesture on the object. The virtual object can also be a virtual hand model, as shown in FIG. 2b, a virtual hand model is used as a mapping of the hand, and the position of the virtual hand model represents the mapping position of the interactive gesture on the object.

In some implementations, the virtual object includes a virtual item, and identifying the user's interaction gesture for the stereoscopic interactive interface and mapping the interaction gesture to the virtual object to perform the interaction operation corresponding to the interaction gesture on a target object in the stereoscopic interactive interface may further include:

Step S102a-1: identifying the user's interactive gestures on the stereoscopic interactive interface based on a convex hull detection algorithm.

Step S102a-2: mapping a first position of the hand to a position of the virtual item based on the type of the interaction gesture, so as to map the interaction gesture to the virtual item, wherein there is a corresponding relationship between the type of the interaction gesture and the first position of the hand.

In some cases, the type of interactive gesture includes an open hand or a clenched fist, the first position includes the palm center of the hand, and the mapping the first position of the hand to the position of the virtual item based on the type of interactive gesture, including: mapping the coordinate of the palm center of the hand to the coordinate of the center point of the virtual item.

In some cases, the type of interaction gesture includes a single finger gesture, the first position includes the fingertip of the single finger, and the mapping the first position of the hand to the position of the virtual item based on the type of interaction gesture, including: mapping the coordinate of the fingertip of the single finger to the coordinate of the center point of the virtual item.

During the interaction process, the interaction gesture may involve five fingers or only one finger. When the virtual object of the hand is the virtual item is, due to the different shapes of the virtual object and the hand, a correspondence between the type of interaction gesture and the first position of the hand is established in advance. For gestures involving five fingers or a fist, the position coordinate of the palm center of the hand is used as the center point coordinate of the virtual item for mapping. For gestures involving a single finger, the coordinate of the fingertip of the finger is used as the center point coordinate of the virtual item for mapping. This ensures that the operation point of any interaction gesture can be accurately extracted to accurately perform the corresponding interaction operation, thereby enhancing the user's interaction experience.

In the application, the convex hull detection algorithm can be used to detect the contour of the interactive gesture to determine what kind of interactive gesture it is. When the interactive gesture is detected as open hand or clenched fist, the center of the contour is used as the coordinate of the palm center and mapped to the center point coordinate of the virtual item. When the interactive gesture is detected as a single finger gesture, the coordinate of the fingertip position corresponding to the single finger in the contour is mapped to the center point coordinate of the virtual item to achieve the mapping of the interactive gesture.

In some implementations, the virtual object includes a virtual hand model, and identifying the user's interaction gesture for the stereoscopic interactive interface and mapping the interaction gesture to the virtual object to perform the interaction operation corresponding to the interaction gesture on the target object in the stereoscopic interactive interface may further include:

Step S102b-1: identifying the user's interactive gestures on the stereoscopic interactive interface based on a joint detection algorithm;

Step S102b-2: mapping the coordinate of each joint position corresponding to the interactive gesture to the coordinate of each joint position of the virtual hand model, so as to map the interactive gesture to the virtual hand model.

In the application, a pre-set virtual hand model is used to map interactive gestures. The coordinate of each joint position of the hand needs to be mapped to the corresponding joint of the virtual hand model, and the position of the corresponding joint position of the virtual hand model is modified according to the joint position coordinate of the hand and displayed by surface texturing.

In some implementations, the light field display is installed with an image acquisition device for capturing interactive gestures. The installation position of the image acquisition device is determined based on the optimal viewing distance of the light field display. Then, when mapping the interactive gestures to virtual objects, coordinate mapping is performed based on the installation position of the image acquisition device and the corresponding coordinate transformation formula, wherein the image acquisition device can be a camera, a webcam, etc.

Figure 4A:
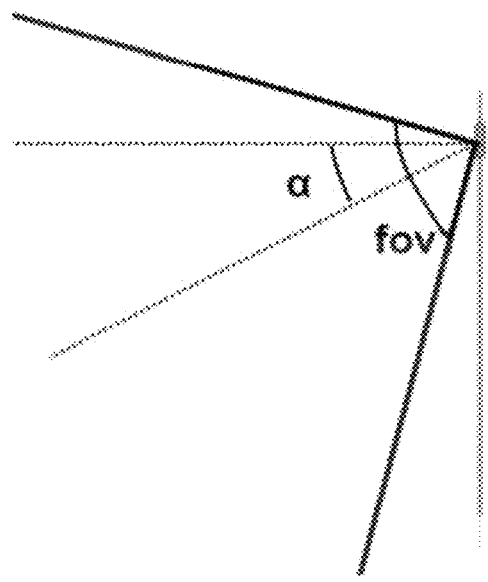

In some cases, the light field display includes a light field display whose optimal viewing distance exceeds a preset distance, and the image acquisition device is installed at the top of the light field display, as shown in FIG. 3a; accordingly, the coverage area of the longitudinal field of view angle FOV of the image acquisition device is shown in FIG. 4a, and when the interactive gesture is mapped to the virtual object, the coordinate mapping is performed according to the first coordinate transformation formula; the first coordinate transformation formula includes:

$$x_n = x_1$$
$$y_n = h + y_1 * \cos\alpha - z_1 * \sin\alpha$$
$$z_n = y_1 * \sin\alpha + z_1 * \cos\alpha$$

wherein, $(x_n, y_n, z_n)$ represent the coordinate of the virtual object, h represents the height of the light field display, $(x_1, y_1, z_1)$ represent the coordinate of the interactive gesture, and $\alpha$ represents an angle between a right ahead direction of the image acquisition device and a horizontal direction.

Figure 3B:
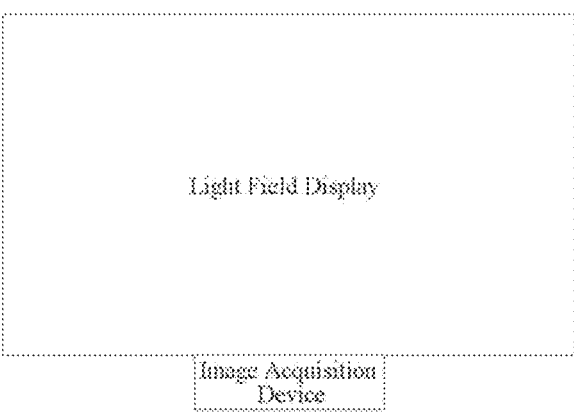
FIG. 3b is a schematic diagram of installing an image acquisition device at the bottom of a light field display provided by an embodiment of the present disclosure.
Figure 4B:
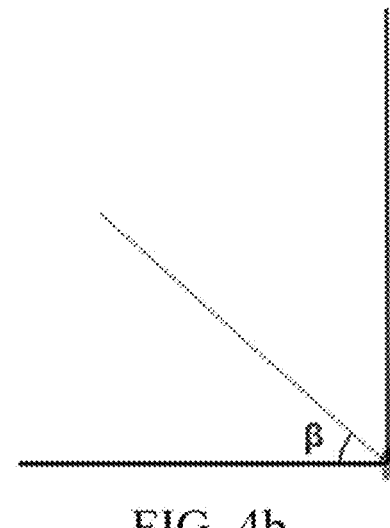
FIG. 4b is a schematic diagram of the coverage area of the longitudinal field of view FOV corresponding to FIG. 3b.

In some cases, the light field display includes a light field display whose optimal viewing distance does not exceed a preset distance, and the image acquisition device is installed at the bottom of the light field display, as shown in FIG. 3b; accordingly, the coverage area of the longitudinal field of view angle FOV of the image acquisition device is shown in FIG. 4b, and when the interactive gesture is mapped to the virtual object, the coordinate mapping is performed according to the second coordinate transformation formula; the second coordinate transformation formula includes:

$$x_n = x_2$$

$$y_n = y_2 * \cos\beta + z_2 * \sin\beta$$

$$z_n = -y_2 * \sin\beta + z_2 * \cos\beta$$

wherein, $(x_n, y_n, z_n)$ represent the coordinate of the virtual object, $(x_2, y_2, z_2)$ represent the coordinate of the interactive gesture, and $\beta$ represents an angle between a right ahead direction of the image acquisition device and a horizontal direction.

Figure 5A:
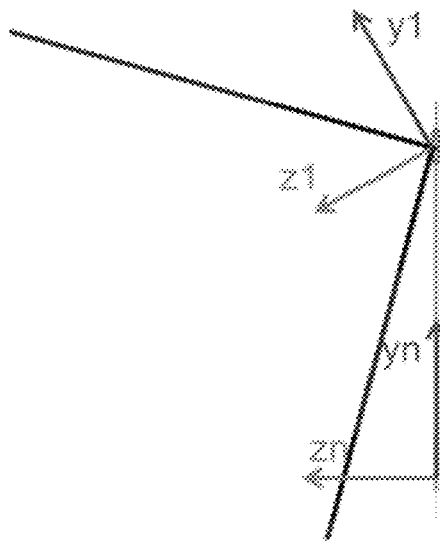
Figure 5B:
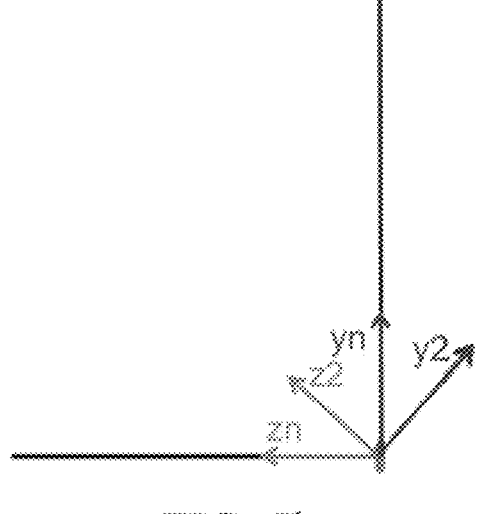
FIG. 5b is a schematic diagram of coordinate system transformation corresponding to FIG. 3b.

Since the camera is at an angle to the horizontal direction, the coordinate system of the camera does not correspond to the coordinate system of the screen image of the light field display, and conversion is required. The coordinate system of the camera is x1y1z1, and the coordinate system of the screen is xnynzn. The coordinate directions of the x-axes of the two coordinate systems are consistent and do not need to be converted. The y1 and z1 coordinates need to be converted to yn and zn coordinates. As shown in FIG. 5a, the camera is installed at the top of the light field display, and the first coordinate transformation formula is used for coordinate mapping. As shown in FIG. 5b, the camera is installed at the bottom of the light field display, and the second coordinate transformation formula is used for coordinate mapping.

It should be understood that the preset distance can be set according to the optimal viewing distance of the vertical light field display. For example, the preset distance can be 5 meters. If the optimal viewing distance exceeds the preset distance, it indicates that the size of the light field display is relatively large, and the interactive gesture is captured and recognized at a long distance. If the optimal viewing distance does not exceed the preset distance, it indicates that the size of the light field display is relatively small, and the interactive gesture is captured and recognized at a close distance. The installation position of the image acquisition device can be different when capturing interactive gestures at close distances or long distances, to achieve accurate recognition of interactive gestures at close distances and long distances.

In some possible situations, when capturing and recognizing interactive gestures at a long distance, the interactive gestures can be mapped into virtual objects, and the interactive operations corresponding to the interactive gestures can be performed on the target objects in the stereoscopic interactive interface. The contours of the interactive gestures can be well identified based on the convex hull detection algorithm, avoiding the accuracy of the interactive operations from being reduced when it is difficult to accurately identify the coordinates of the joint positions of the interactive gesture images obtained at a long distance.

In some possible situations, when capturing and identifying interactive gestures at close range, the interactive gestures can be mapped to a virtual hand model, and the interactive operation corresponding to the interactive gesture can be performed on the target object in the stereoscopic interactive interface. The coordinates of the joint positions of the hand of the current interactive gesture can be well identified based on the joint detection algorithm, and the coordinates of the identified joint positions can be mapped one by one to the joints of the virtual hand model to achieve accurate interaction and a good user experience. It should be understood that when capturing and identifying interactive gestures at close range, the interactive gestures can also be mapped to a virtual object, and the interactive operation corresponding to the interactive gesture can be performed on the target object in the stereoscopic interactive interface. The contour of the interactive gesture can be well identified based on the convex hull detection algorithm. In the case of different interactive gestures, the coordinate of the palm center or the fingertip can be mapped to the virtual object to accurately indicate the location of the interactive operation.

In some implementations, the interactive gesture includes a single finger gesture; and performing an interactive operation corresponding to the interactive gesture on a target object in the stereoscopic interactive interface includes:

Detect the duration of the single finger gesture touching the target object; determine whether the duration reaches the preset duration Tn; if the duration reaches the preset duration Tn, determine that the interaction operation corresponding to the single finger gesture is a long press operation; and if the duration does not reach the preset duration, determine that the interaction operation corresponding to the single finger gesture is a click operation.

In the actual interaction process, when a single finger touches a target object in the stereoscopic interactive interface, it can be determined whether the current interaction gesture is a click operation or a long press operation according to the duration of contact with the target object.

Figure 6A:
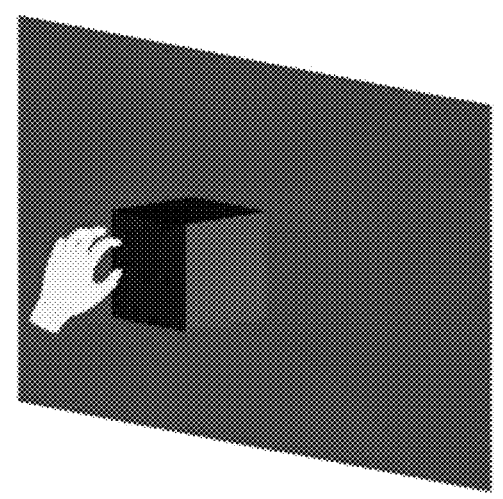
FIG. 6a is a schematic diagram of a grab operation provided by an embodiment of the present disclosure.
Figure 6B:
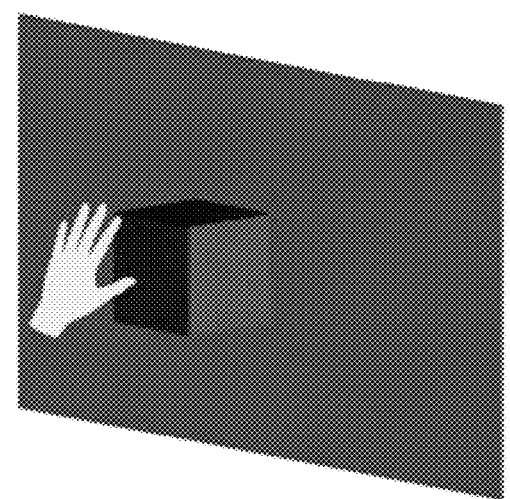
FIG. 6b is a schematic diagram of a release operation provided by an embodiment of the present disclosure.

In some implementations, the interactive gesture also includes an open hand. When the gesture shown in FIG. 6a appears (an open hand with bent fingertips), the corresponding interactive operation is determined to be a grab operation. When the gesture shown in FIG. 6b appears (an open hand), the corresponding interactive operation is determined to be a release operation, completing a grab-and-release interactive operation process.

This embodiment also provides an example of a stereoscopic interactive interface. The changes of the stereoscopic interactive interface under different interactive operations are as follows:

Case 1: The target object includes first-level menu items, and the stereoscopic interactive interface includes at least one first-level menu item. The at least one first-level menu item is displayed in the first preset area (for example, the left area) of the stereoscopic interactive interface according to a preset spatial display stack order. Taking FIG. 7a as an example, it is the arrangement of the first-level menu items after entering the interactive interface system. The first-level menu items are displayed in the left area of the interface according to the spatial display stack order. The first-level menu items include Setup, Shop, Image, APP, and Video.

Furthermore, adjusting the display content of the stereoscopic interactive interface based on the interactive operation may include:

In response to a click operation on the first first-level menu item, the spatial display level of the first first-level menu item is adjusted to the highest spatial display level, and/or the display color of the first first-level menu item is adjusted; wherein the highest spatial display level is the spatial display level closest to the user.

It should be understood that the first first-level menu item is any first-level menu item that the user wants to interact with.

Taking the virtual hand model as an example, when the virtual hand model clicks on the first-level menu item "App" (as shown in FIG. 7b), the regional display of the first-level menu items changes, the clicked first-level menu item moves to the most front and is displayed at the highest spatial display level. At the same time, the first-level menu item clicked previously moves to the second front, and the remaining first-level menu items change in turn. The display color of the selected first-level menu item can be modified at the same time to prompt the operator that the menu has been selected (activated) (as shown in FIG. 7c).

Case 2: The target object includes a first-level menu item, the stereoscopic interactive interface includes at least one first-level menu item, the at least one first-level menu item is displayed in a first preset area of the stereoscopic interactive interface according to a preset spatial display stack order, and the interactive operation further includes a grab operation;

Adjusting the display content of the stereoscopic interactive interface based on the interactive operation, including:

Based on the grab operation on the second first-level menu item, move the second first-level menu item, a generate a second second-level menu display area corresponding to the second first-level menu item, and display it at the highest spatial display level in the second preset area of the stereoscopic interaction interface (for example, the right area of the stereoscopic interaction interface); wherein the highest spatial display level is the spatial display level closest to the user.

It should be understood that the second first-level menu item is any first-level menu item that the user wants to interact with.

Furthermore, when the second second-level menu display area is displayed in the second preset area of the stereoscopic interactive interface, based on a grab operation on the second second-level menu display area, the second second-level menu display area is moved to the third preset area (for example, the upper edge) of the stereoscopic interactive interface to close the second second-level menu display area.

Furthermore, in a state where the second second-level menu display area is displayed in the second preset area of the stereoscopic interactive interface, in response to a click operation on the third first-level menu item, the spatial display level of the third first-level menu item is adjusted to the highest spatial display level, and/or the display color of the third first-level menu item is adjusted to indicate that it has been selected; at the same time, the display color of the second second-level menu display areas is adjusted to the display color when it is not selected; and based on a grab operation on the third first-level menu item, the third first-level menu item is moved, a third second-level menu display area corresponding to the third first-level menu item is generated, and is displayed in the second preset area of the stereoscopic interactive interface with the highest spatial display level, and at the same time the previous second level menu display area is adjusted to the second-level spatial display level.

Furthermore, in response to moving the virtual object away from the user, the third second-level menu display area is hidden, and the second level menu display area of the next lower spatial display level is displayed; and in response to moving the virtual object toward the user, the hidden third second-level menu display area is displayed again.

Figure 8F:
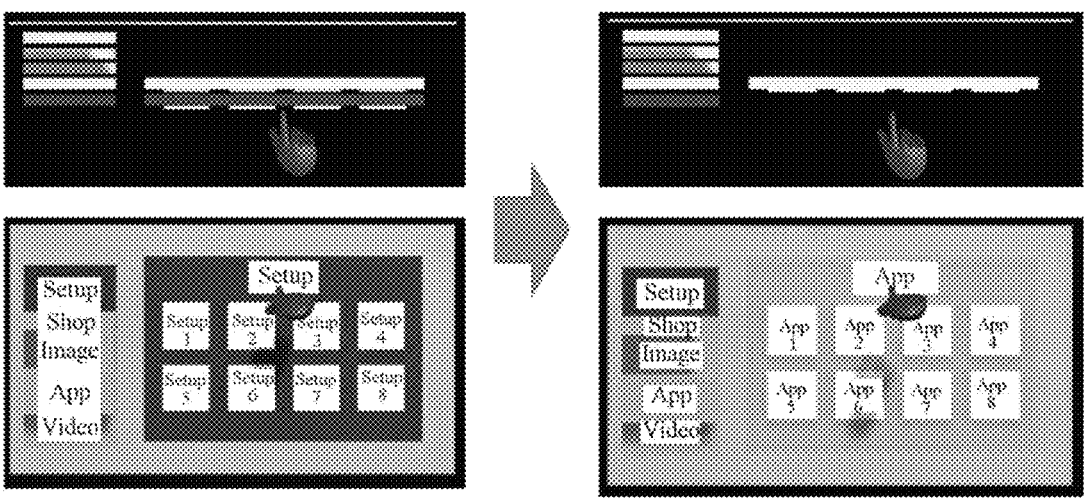
FIG. 8f is a schematic diagram showing that the second-level menu display area will be redisplayed according to an embodiment of the present disclosure.

Taking the virtual hand model as an example, when the first-level menu item "App" is selected by the click operation, the first-level menu item is moved to the right using the grab operation, and a second-level menu display area will be pulled out (as shown in FIG. 8a). The display area contains at least one second-level menu item (App 1, . . . , App 8). When the second-level menu display area is grabbed and pulled to the upper edge of the screen using the grab operation, the second-level menu display area will be closed, and the color of the corresponding first-level menu item "App" will return to the unselected display color (as shown in FIG. 8b). When the second-level menu item display area is not closed (in the display state), if another first-level menu item is clicked, the second-level menu display area will be adjusted with the first-level menu items, and the entire second-level menu item display area will be switched to an inactive state (as shown in FIG. 8c). At this time, another second-level menu display area can be pulled out using a grab operation to the right, whose display level is higher than the previous second-level menu display area, that is, the spatial position is before the previous second-level menu display area (as shown in FIG. 8d, the spatial display level of the second-level menu item display area corresponding to the first-level menu item "Setup" is higher than the previous second-level menu item display area corresponding to "App", so the previous display area is hidden). At this time, if the user extends his hand forward again, the second-level menu display area in front (the second-level menu item display area corresponding to "Setup") will be directly hidden, and other second-level menu display areas in the back will be displayed (as shown in FIG. 8e). When the user moves his hand backward, the previously hidden second-level menu display area will be displayed again (as shown in FIG. 8f).

Case 3: Adjusting the display content of the stereoscopic interactive interface based on the interactive operation, further includes:

In response to a click operation on any second-level menu item in the second second-level menu display area, displaying an interface corresponding to the second-level menu item in full screen mode.

In the full-screen state, in response to a long press operation on the first preset area of the stereoscopic interactive interface, the first-level menu items hidden in the first preset area of the full-screen interface are restored to display.

In response to a click operation on any first-level menu item, the interface displayed in full screen mode is displayed in thumbnail mode.

Figure 9A:
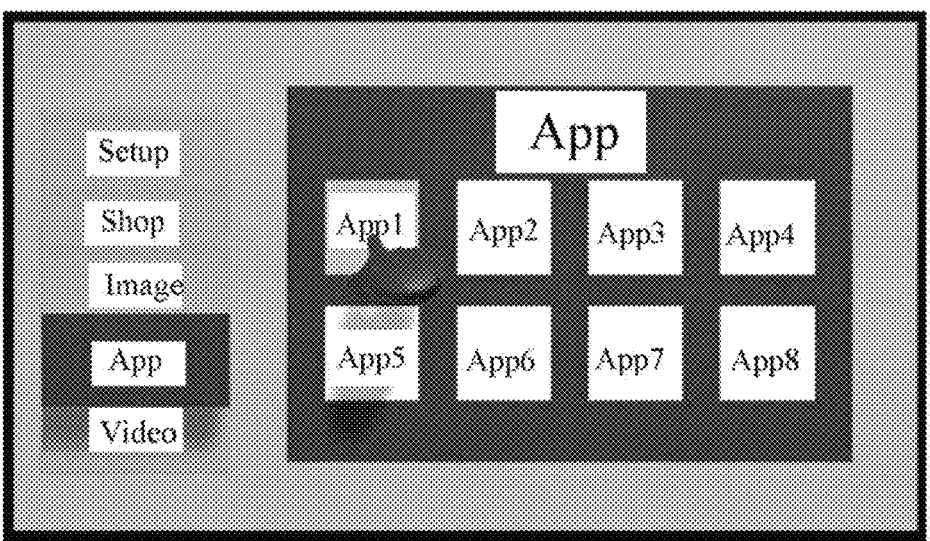
FIG. 9a is a schematic diagram of clicking a second-level menu item in a second-level menu display area provided by an embodiment of the present disclosure.
Figure 9B:
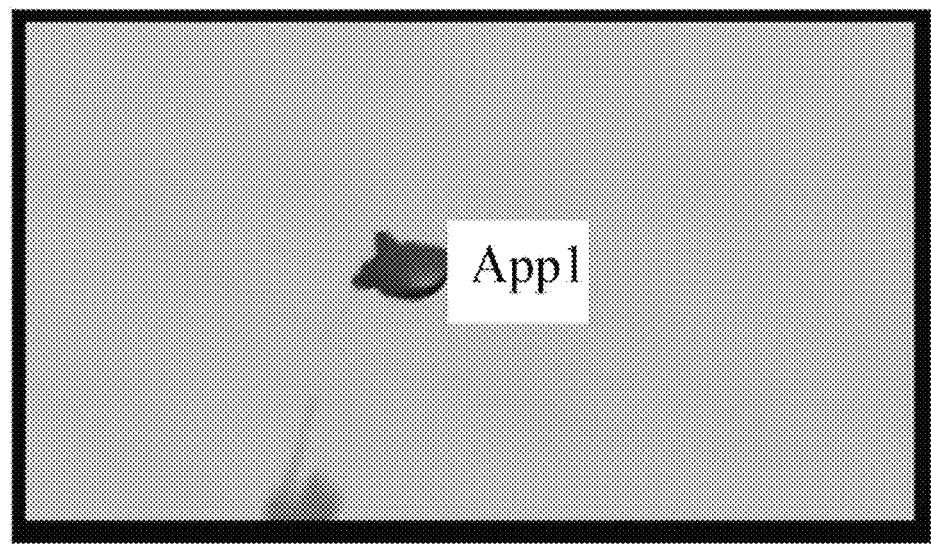
FIG. 9b is a schematic diagram of a full-screen display of second-level menu items provided by an embodiment of the present disclosure.
Figure 9C:
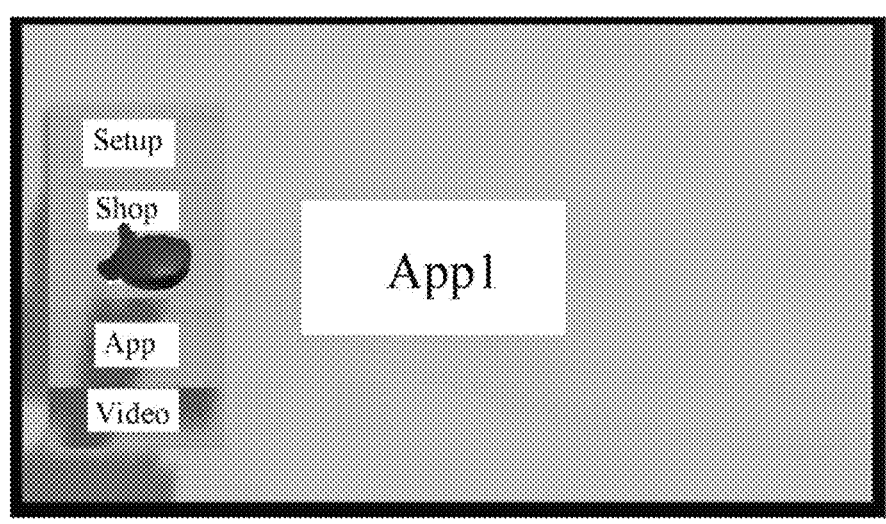
FIG. 9c is a schematic diagram of restoring the display of first-level menu items in a full-screen display state provided by an embodiment of the present disclosure.
Figure 9D:
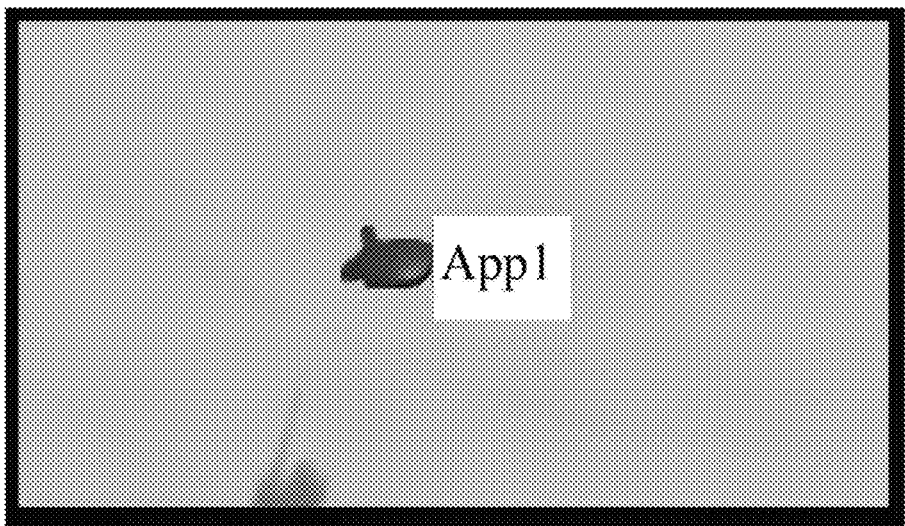
FIG. 9d is a schematic diagram showing the hiding of a first-level menu item in a full-screen state provided by an embodiment of the present disclosure.
Figure 9E:
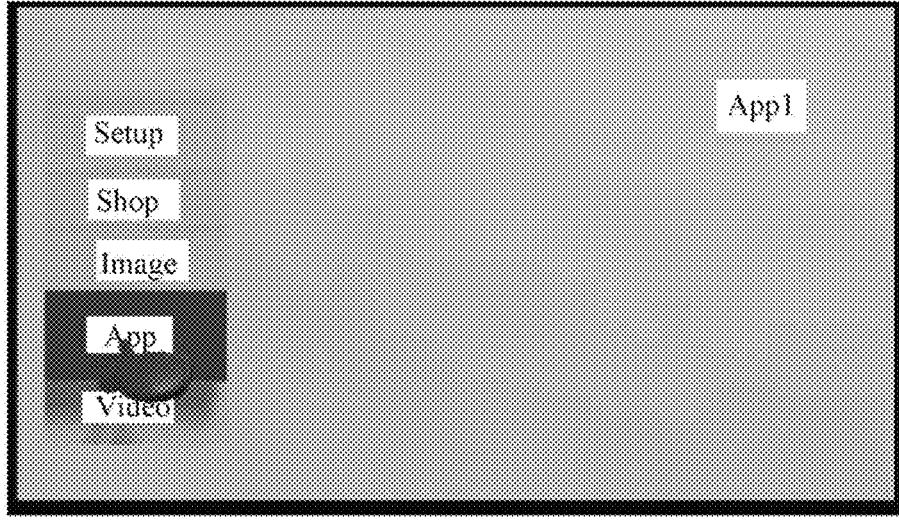
FIG. 9e is a schematic diagram of thumbnail states of second-level menu items provided by an embodiment of the present disclosure.

Taking the virtual hand model as an example, directly clicking on the interface of the second-level menu item "App 1" in the second-level menu display area (as shown in FIG. 9a) will directly enter the application interface. At this time, App 1 fills the screen, and the first-level menu items and the second-level menu display area will be directly hidden (as shown in FIG. 9b). If a single finger long press operation is performed in the left area of the screen, to stay in the left area for a long time, the first-level menu item will pop up and resume display (as shown in FIG. 9c). After the finger leaves the left area of the screen, the first-level menu item will return to being hidden in the full screen mode (as shown in FIG. 9d). If any primary menu item is clicked on and activated at this time, the application will shrink and display a thumbnail state in the non-first preset area of the stereoscopic interactive interface (as shown in FIG. 9e). In this state, operations such as those in Case 2 can be performed normally.

Case 4: When there is at least one thumbnail, adjusting the display content of the stereoscopic interactive interface based on the interactive operation, further includes:

Move any thumbnail based on the grab operation to change the display position of the thumbnail; or, In response to moving any thumbnail to the third preset area of the stereoscopic interactive interface through the grab operation, close the thumbnail; or, In response to a long press operation on any thumbnail, generating an operation option for the thumbnail; or, In response to moving the virtual object penetrating any thumbnail in a direction away from the user, hide the thumbnail, and in response to moving the virtual object in a direction close to the user to leave the thumbnail, restored the thumbnail to display.

Figure 10D:
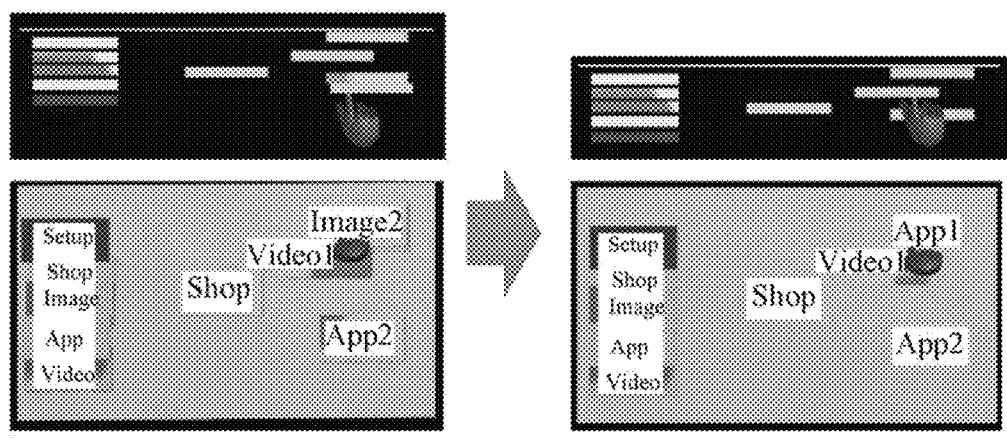
FIG. 10d is a schematic diagram of automatic hiding of thumbnails provided by an embodiment of the present disclosure.
Figure 10E:
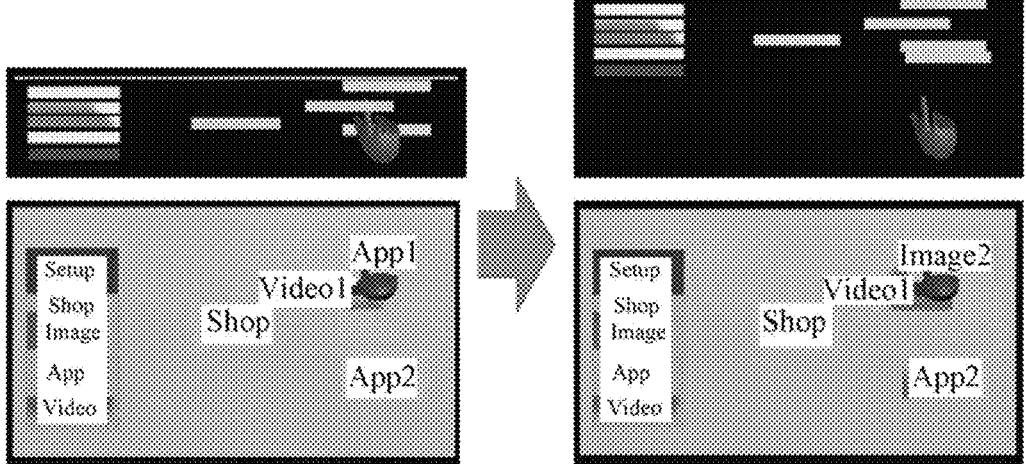
FIG. 10e is a schematic diagram of redisplaying a hidden thumbnail provided by an embodiment of the present disclosure.
Figure 10F:
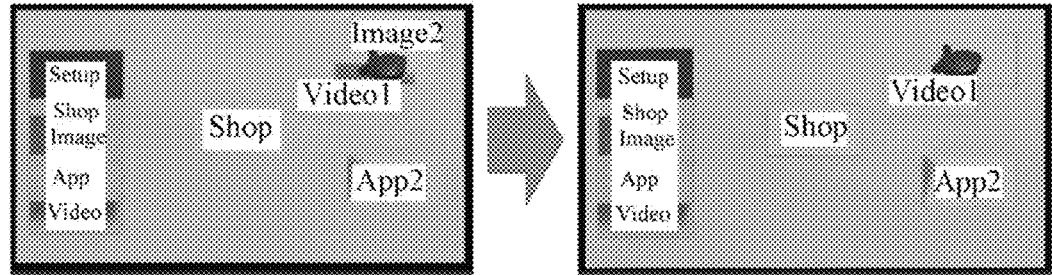
FIG. 10f is a schematic diagram of closing a thumbnail provided by an embodiment of the present disclosure.
Figure 10G:
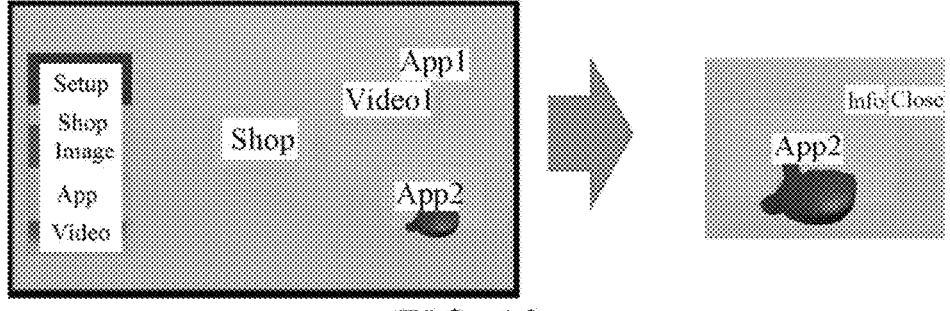
FIG. 10g is a schematic diagram of a long press operation on a thumbnail provided by an embodiment of the present disclosure.

Still taking the virtual hand model as an example, there are multiple thumbnails of Apps/images/videos at the same time (as shown in FIG. 10a). The position of a thumbnail of an App/image/video can be moved by grabbing (as shown in FIG. 10b). An App can also be activated by clicking (as shown in FIG. 10c). When a finger passes through a thumbnail of an App/image/video, it will automatically hide and the thumbnails of other Apps/images/videos that are blocked behind will be displayed (as shown in FIG. 10d). After the finger moves backward and leaves the thumbnails of these Apps/images/videos, the hidden thumbnails of the Apps/images/videos will be redisplayed (as shown in FIG. 10e). After grabbing a thumbnail of an App/image/video using the grab operation and dragging it to the upper edge of the screen, the thumbnail of the App/image/video will be closed (as shown in FIG. 10f). By long pressing the thumbnail of an App/image/video, an operation button will pop up. Clicking the corresponding button can perform the corresponding operation (as shown in FIG. 10g). For example, clicking "Info" can display the information of the App/image/video, and clicking "Close" can close the thumbnail of the App/image/video.

Embodiment 2

Figure 11:
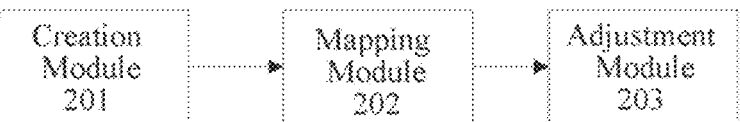
FIG. 11 is a block diagram of an interactive device for a light field display provided by an embodiment of the present disclosure.

FIG. 11 shows a block diagram of an interactive device for a light field display. The interactive device for a light field display provided in this embodiment, as shown in FIG. 11, includes:

a creation module 201, configured to a virtual object on a stereoscopic interactive interface displayed by a target light field display to map a user's interactive gesture on the stereoscopic interactive interface;

a mapping module 202, configured to perform an interactive operation corresponding to the interactive gesture on a target object in the stereoscopic interactive interface, by recognizing the user's interactive gesture for the stereoscopic interactive interface and mapping the interactive gesture to the virtual object; and an adjustment module 203, configured to adjust a display content of the stereoscopic interactive interface based on the interactive operation.

In some implementations, the virtual objection includes a virtual item, and the performing the interactive operation corresponding to the interactive gesture on the target object in the stereoscopic interactive interface, by recognizing the user's interactive gesture for the stereoscopic interactive interface and mapping the interactive gesture to the virtual object includes:

recognizing the user's interactive gesture on the stereoscopic interactive interface based on a convex hull detection algorithm; and mapping the interaction gesture to the virtual item by mapping a first position of a hand to a position of the virtual item based on a type of the interaction gesture, wherein the type of the interaction gesture is associated with the first position of the hand.

In some cases, the type of the interactive gesture including an open hand or a clenched fist, the first position includes a palm center, and mapping the first position of the hand to the position of the virtual item based on the type of the interactive gesture includes: mapping a coordinate of the palm center to a coordinate of a center point of the virtual item.

In some cases, the type of the interactive gesture includes a single finger gesture, the first position includes a fingertip of the single finger, and the mapping first position of the hand to the position of the virtual item based on the type of the interactive gesture includes: mapping a coordinate of the fingertip of the single finger to a coordinate of a center point of the virtual item.

In some implementations, the virtual object includes a virtual hand model, and the performing the interactive operation corresponding to the interactive gesture on the target object in the stereoscopic interactive interface, by recognizing the user's interactive gesture for the stereoscopic interactive interface and mapping the interactive gesture to the virtual object includes:

recognizing the user's interactive gesture on the stereoscopic interactive interface based on a joint detection algorithm; and mapping the interaction gesture to the virtual hand model by mapping a coordinate of each joint position corresponding to the interactive gesture to a coordinate of each joint position of the virtual hand model.

In some implementations, the light field display includes an image acquisition device for acquiring the interactive gesture, and an installation position of the image acquisition device is determined according to an optimal viewing distance of the light field display; and correspondingly, when mapping the interactive gesture to the virtual object, a coordinate mapping is performed according to the installation position of the image acquisition device and a corresponding coordinate transformation formula.

In some cases, the light field display includes a light field display whose optimal viewing distance exceeds a preset distance, and the image acquisition device is installed at a top of the light field display; and correspondingly, when mapping the interactive gesture to the virtual object, the coordinate mapping is performed according to a first coordinate transformation formula; and the first coordinate transformation formula includes:

$$x_n = x_1$$
$$y_n = h + y_1 * \cos\alpha - z_1 * \sin\alpha$$
$$z_n = y_1 * \sin\alpha + z_1 * \cos\alpha$$

wherein, $(x_n, y_n, z_n)$ represent the coordinate of the virtual object, h represents the height of the light field display, $(x_1, y_1, z_1)$ represent the coordinate of the interactive gesture, and α represents an angle between a right ahead direction of the image acquisition device and a horizontal direction.

In some cases, the light field display includes a light field display whose optimal viewing distance does not exceed a preset distance, and the image acquisition device is installed at a bottom of the light field display; correspondingly, when mapping the interactive gesture to the virtual object, the coordinate mapping is performed according to a second coordinate transformation formula; the second coordinate transformation formula includes:

$$x_n = x_2$$
$$y_n = y_2 * \cos\beta + z_2 * \sin\beta$$
$$z_n = -y_2 * \sin\beta + z_2 * \cos\beta$$

wherein, $(x_n, y_n, z_n)$ represent the coordinate of the virtual object, $(x_2, y_2, z_2)$ represent the coordinate of the interactive gesture, and β represents an angle between a right ahead direction of the image acquisition device and a horizontal direction.

In some implementations, the interactive gesture includes a single finger gesture; and the performing the interactive operation corresponding to the interactive gesture on the target object in the stereoscopic interactive interface includes: detecting a duration of the single finger gesture touching the target object in the stereoscopic interactive interface; determining whether the duration reaches a preset duration; in a case that the duration reaches a preset duration, determining that the interaction operation corresponding to the single finger gesture is a long press operation; and in a case that the duration does not reach the preset duration, determining that the interaction operation corresponding to the single finger gesture is a click operation.

In some implementations, the target object includes a first-level menu item, the stereoscopic interactive interface includes at least one first-level menu item, and the at least one first-level menu item is displayed in a first preset area of the stereoscopic interactive interface according to a preset spatial display stack order; the adjusting the display content of the stereoscopic interactive interface based on the interactive operation includes:

in response to a click operation on a first first-level menu item, adjusting a spatial display level of the first first-level menu item to a highest spatial display level, and/or adjusting a display color of the first first-level menu item; wherein the highest spatial display level is a spatial display level closest to the user.

In some implementations, the target object includes a first-level menu item, the stereoscopic interactive interface includes at least one first-level menu item, and the at least one first-level menu item is displayed in a first preset area of the stereoscopic interactive interface according to a preset spatial display stack order, and the interactive operation further includes a grab operation; the adjusting the display content of the stereoscopic interactive interface based on the interactive operation includes:

moving a second first-level menu item based on a grab operation on the second first-level menu item, generating a second second-level menu display area corresponding to the second first-level menu item, and displaying the second second-level menu display area in a second preset area of the stereoscopic interactive interface at the highest spatial display level; wherein the highest spatial display level is a spatial display level closest to the user.

Further, the adjusting the display content of the stereoscopic interactive interface based on the interactive operation further includes:

moving the second second-level menu display area to a third preset area of the stereoscopic interactive interface to close the second second-level menu display area, based on a grab operation on the second second-level menu display area.

Further, the adjusting the display content of the stereoscopic interactive interface based on the interactive operation further includes:

in a case that the second second-level menu display area is displayed in the second preset area of the stereoscopic interactive interface, in response to a click operation on a third first-level menu item, adjusting the spatial display level of the third first-level menu item to the highest spatial display level, and/or adjusting the display color of the third first-level menu item; and based on a grab operation on the third first-level menu item, moving the third first-level menu item and generating a third second-level menu display area corresponding to the third first-level menu item, and displaying the third second-level menu display area in a third preset area of the stereoscopic interactive interface at the highest spatial display level.

Further, the adjusting the display content of the stereoscopic interactive interface based on the interactive operation further includes:

in response to the virtual object moving away from the user, hiding the third and second-level menu display areas, and displaying a second-level menu display areas of a next lower level; and in response to the virtual object moving toward the user, displaying the hidden third second-level menu display areas again.

Further, the adjusting the display content of the stereoscopic interactive interface based on the interactive operation further includes:

in response to a click operation on any second-level menu item in the second second-level menu display area, displaying an interface corresponding to the second-level menu item in full screen mode;

in the full-screen state, in response to a long press operation on the first preset area of the stereoscopic interactive interface, restoring display of the first-level menu items hidden under the interface displayed in the full-screen mode; and in response to a click operation on any first-level menu item, displaying the interface displayed in full screen mode in thumbnail mode.

Further, the adjusting the display content of the stereoscopic interactive interface based on the interactive operation further includes:

moving any thumbnail based on a grab operation to change a display position of the thumbnail; or, in response to moving any thumbnail to a third preset area of the stereoscopic interactive interface through a grab operation, closing the thumbnail; or, in response to a long press operation on any thumbnail, generating an operation option for the thumbnail; or, in response to the virtual object penetrating any thumbnail in a direction away from the user, hiding the thumbnail; and in response to the virtual object moving in a direction close to the user to leave the thumbnail, restoring display of the thumbnail.

It should be understood that the device of this embodiment has at least all the beneficial effects of the first embodiment.

Those skilled in the art should understand that the above modules or steps can be implemented by a general-purpose computing device, they can be centralized on a single computing device, or distributed on a network including multiple computing devices, and optionally, they can be implemented by a program code executable by a computing device, so that they can be stored in a storage device and executed by the computing device, or they can be made into individual integrated circuit modules, or multiple modules or steps therein can be made into a single integrated circuit module for implementation. The present disclosure is not limited to any limited combination of hardware and software.

Embodiment 3

This embodiment provides a computer storage medium, on which a computer program is stored. When the computer program is executed by one or more processors, the interaction method for a light field display of the first embodiment is implemented.

The storage medium may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The interactive method for the light field display is described in detail in Embodiment 1, and will not be repeated in this embodiment.

Embodiment 4

This embodiment provides a light field display, including a memory and one or more processors. The memory stores a computer program. When the computer program is executed by the one or more processors, the interaction method for the light field display of the above embodiment is implemented.

In practical applications, the processor can be an application specific integrated circuit (ASIC), a digital signal processor (DSP), a digital signal processing device (DSPD), a programmable logic device (PLD), a field programmable gate array (FPGA), a controller, a microcontroller unit (MCU), a microprocessor or other electronic components to implement the interactive method for the light field display in the above embodiment. The content of the method is detailed in Example 1 and will not be repeated in this embodiment.

Embodiment 5

This embodiment provides a light field display system, including:

the light field display of the above embodiment; and an image acquisition device, connected to the light field display and is used to acquire interactive gestures.

In practical applications, the image acquisition device may be a camera, a webcam, etc., which acquires images of interactive gestures and transmits them to the processor of the light field display to recognize the interactive gestures.

The installation position of the image acquisition device is determined according to the optimal viewing distance of the light field display. Then, when the interactive gesture is mapped to the virtual object, the coordinate mapping is performed according to the installation position of the image acquisition device and the corresponding coordinate transformation formula.

In some cases, when the light field display is a light field display with an optimal viewing distance exceeding a preset distance, the image acquisition device is installed at the top of the light field display, and the longitudinal field angle of the image acquisition device is set in a range of 90° to 120°, and the angle between the right ahead direction of the image acquisition device and the horizontal direction is set in a range of 45° to 60°.

In some cases, when the light field display is a light field display whose optimal viewing distance does not exceed a preset distance, the image acquisition device is installed at the bottom of the light field display, the longitudinal field angle of the image acquisition device is set in a range of 60° to 90°, and the angle between the front of the image acquisition device and the horizontal direction is set by the following relationship:

$$\alpha = 90° - \frac{fov}{2} - \arctan\frac{l}{h}$$

Wherein, h represents the height of the light field display, α represents the angle between the right ahead direction of the image acquisition device and the horizontal direction, fov represents the longitudinal field of view of the image acquisition device, and l represents the optimal viewing distance.

Furthermore, the image acquisition device can be installed at the top or the bottom of the light field display according to the angle between the right ahead of the image acquisition device and the horizontal direction to achieve long-distance or short-distance interactive gesture recognition.

In some possible scenarios, the system also includes a facial recognition module, such as a camera, a webcam, etc. The facial recognition module is installed at the top of the light field display and faces the user. It is used to detect whether there is a user's face in front of the light field display during the interaction process. If the face cannot be detected for a preset period of time, the system stops operating to avoid wasting resources.

In the several embodiments provided in the embodiments of the present disclosure, it should be understood that the disclosed device can also be implemented in other ways. The device embodiments described above are only exemplary.

It should be noted that, in this disclosure, the terms "first", "second", etc. in the specification and claims of this application and the above-mentioned drawings are used to distinguish similar objects, and are not necessarily used to describe a specific order or sequence. The terms "comprise", "include" or any other variants thereof are intended to cover non-exclusive inclusion, so that a process, method, article or device including a series of elements includes not only those elements, but also other elements not explicitly listed, or also includes elements inherent to such process, method, article or device. In the absence of further restrictions, an element defined by the sentence "comprises a . . . " does not exclude the presence of other identical elements in the process, method, article or device including the element.

Although the embodiments disclosed in the present disclosure are as above, the contents described are only embodiments adopted for facilitating the understanding of the present disclosure and are not intended to limit the present disclosure. Any of those skilled in the art to which the present disclosure belongs can make any modifications and changes in the form and details of the implementation without departing from the spirit and scope disclosed in the present disclosure, but the patent protection scope of the present disclosure shall still be subject to the scope defined in the attached claims.

What is claimed is:

1. An interactive method for light field display, comprising:

creating a virtual object on a stereoscopic interactive interface displayed by a target light field display to map a user's interactive gesture on the stereoscopic interactive interface;

performing an interactive operation corresponding to the interactive gesture on a target object in the stereoscopic interactive interface, by recognizing the user's interactive gesture for the stereoscopic interactive interface and mapping the interactive gesture to the virtual object; and adjusting a display content of the stereoscopic interactive interface based on the interactive operation, wherein the virtual object comprises a virtual item, and the performing the interactive operation corresponding to the interactive gesture on the target object in the stereoscopic interactive interface, by recognizing the user's interactive gesture for the stereoscopic interactive interface and mapping the interactive gesture to the virtual object comprises: recognizing the user's interactive gesture on the stereoscopic interactive interface based on a convex hull detection algorithm; and mapping the interaction gesture to the virtual item by mapping a first position of a hand to a position of the virtual item based on a type of the interaction gesture, wherein the type of the interaction gesture is associated with the first position of the hand, wherein the type of the interactive gesture comprising an open hand or a clenched fist, the first position comprises a palm center, and mapping the first position of the hand to the position of the virtual item based on the type of the interactive gesture comprises: mapping a coordinate of the palm center to a coordinate of a center point of the virtual item, wherein the light field display comprises an image acquisition device for acquiring the interactive gesture, and an installation position of the image acquisition device is determined according to an optimal viewing distance of the light field display; and when mapping the interactive gesture to the virtual object, a coordinate mapping is performed according to the installation position of the image acquisition device and a corresponding coordinate transformation formula, wherein the light field display comprises a light field display whose optimal viewing distance exceeds a preset distance, and the image acquisition device is installed at a top of the light field display; and when mapping the interactive gesture to the virtual object, the coordinate mapping is performed according to a first coordinate transformation formula; and the first coordinate transformation formula comprises:

$$x_n = x_1$$
$$y_n = h + y_1 * \cos\alpha - z_1 * \sin\alpha$$
$$z_n = y_1 * \sin\alpha + z_1 * \cos\alpha$$

wherein, $(x_n, y_n, z_n)$ represent the coordinate of the virtual object, h represents the height of the light field display, $(x_1, y_1, z_1)$ represent the coordinate of the interactive gesture, and $\alpha$ represents an angle between a right ahead direction of the image acquisition device and a horizontal direction, or, wherein the light field display comprises a light field display whose optimal viewing distance does not exceed a preset distance, and the image acquisition device is installed at a bottom of the light field display: when mapping the interactive gesture to the virtual object, the coordinate mapping is performed according to a second coordinate transformation formula; the second coordinate transformation formula comprises:

$$x_n = x_2$$
$$y_n = y_2 * \cos\beta + z_2 * \sin\beta$$
$$z_n = -y_2 * \sin\beta + z_2 * \cos\beta$$

wherein, $(x_n, y_n, z_n)$ represent the coordinate of the virtual object, $(x_2, y_2, z_2)$ represent the coordinate of the interactive gesture, and $\beta$ represents an angle between a right ahead direction of the image acquisition device and a horizontal direction.

2. The interactive method for light field display according to claim 1, wherein the type of the interactive gesture comprises a single finger gesture, the first position comprises a fingertip of the single finger, and the mapping first position of the hand to the position of the virtual item based on the type of the interactive gesture comprises:

mapping a coordinate of the fingertip of the single finger to a coordinate of a center point of the virtual item.

3. The interactive method for light field display according to claim 1, wherein the virtual object comprises a virtual hand model, and the performing the interactive operation corresponding to the interactive gesture on the target object in the stereoscopic interactive interface, by recognizing the user's interactive gesture for the stereoscopic interactive interface and mapping the interactive gesture to the virtual object comprises:

recognizing the user's interactive gesture on the stereoscopic interactive interface based on a joint detection algorithm; and mapping the interaction gesture to the virtual hand model by mapping a coordinate of each joint position corresponding to the interactive gesture to a coordinate of each joint position of the virtual hand model.

4. An interactive method for light field display, comprising:

creating a virtual object on a stereoscopic interactive interface displayed by a target light field display to map a user's interactive gesture on the stereoscopic interactive interface;

performing an interactive operation corresponding to the interactive gesture on a target object in the stereoscopic interactive interface, by recognizing the user's interactive gesture for the stereoscopic interactive interface and mapping the interactive gesture to the virtual object; and adjusting a display content of the stereoscopic interactive interface based on the interactive operation, wherein the interactive gesture comprises a single finger gesture; and the performing the interactive operation corresponding to the interactive gesture on the target object in the stereoscopic interactive interface comprises:

detecting a duration of the single finger gesture touching the target object in the stereoscopic interactive interface;

determining whether the duration reaches a preset duration;

in a case that the duration reaches a preset duration, determining that the interaction operation corresponding to the single finger gesture is a long press operation; and in a case that the duration does not reach the preset duration, determining that the interaction operation corresponding to the single finger gesture is a click operation, wherein the target object comprises a first-level menu item, the stereoscopic interactive interface comprises at least one first-level menu item, and the at least one first-level menu item is displayed in a first preset area of the stereoscopic interactive interface according to a preset spatial display stack order, and the interactive operation further comprises a grab operation;

the adjusting the display content of the stereoscopic interactive interface based on the interactive operation comprises:

moving a second first-level menu item based on a grab operation on the second first-level menu item, generating a second second-level menu display area corresponding to the second first-level menu item, and displaying the second second-level menu display area in a second preset area of the stereoscopic interactive interface at the highest spatial display level;

wherein the highest spatial display level is a spatial display level closest to the user.

5. The interactive method for light field display according to claim 4, wherein the target object comprises a first-level menu item, the stereoscopic interactive interface comprises at least one first-level menu item, and the at least one first-level menu item is displayed in a first preset area of the stereoscopic interactive interface according to a preset spatial display stack order;

the adjusting the display content of the stereoscopic interactive interface based on the interactive operation comprises:

in response to a click operation on a first first-level menu item, adjusting a spatial display level of the first first-level menu item to a highest spatial display level, and/or adjusting a display color of the first first-level menu item;

wherein the highest spatial display level is a spatial display level closest to the user.

6. The interactive method for light field display according to claim 4, wherein the adjusting the display content of the stereoscopic interactive interface based on the interactive operation further comprises:

moving the second second-level menu display area to a third preset area of the stereoscopic interactive interface to close the second second-level menu display area, based on a grab operation on the second second-level menu display area.

7. The interactive method for light field display according to claim 4, wherein the adjusting the display content of the stereoscopic interactive interface based on the interactive operation further comprises:

in a case that the second second-level menu display area is displayed in the second preset area of the stereoscopic interactive interface, in response to a click operation on a third first-level menu item, adjusting the spatial display level of the third first-level menu item to the highest spatial display level, and/or adjusting the display color of the third first-level menu item; and based on a grab operation on the third first-level menu item, moving the third first-level menu item and generating a third second-level menu display area corresponding to the third first-level menu item, and displaying the third second-level menu display area in a third preset area of the stereoscopic interactive interface at the highest spatial display level.

8. The interactive method for light field display according to claim 7, wherein the adjusting the display content of the stereoscopic interactive interface based on the interactive operation further comprises:

in response to the virtual object moving away from the user, hiding the third and second-level menu display areas, and displaying a second-level menu display areas of a next lower level; and in response to the virtual object moving toward the user, displaying the hidden third second-level menu display areas again.

9. The interactive method for light field display according to claim 4, wherein the adjusting the display content of the stereoscopic interactive interface based on the interactive operation further comprises:

in response to a click operation on any second-level menu item in the second second-level menu display area, displaying an interface corresponding to the second-level menu item in full screen mode;

in the full-screen state, in response to a long press operation on the first preset area of the stereoscopic interactive interface, restoring display of the first-level menu items hidden under the interface displayed in the full-screen mode; and in response to a click operation on any first-level menu item, displaying the interface displayed in full screen mode in thumbnail mode.

10. The interactive method for light field display according to claim 9, wherein the adjusting the display content of the stereoscopic interactive interface based on the interactive operation further comprises:

moving any thumbnail based on a grab operation to change a display position of the thumbnail; or, in response to moving any thumbnail to a third preset area of the stereoscopic interactive interface through a grab operation, closing the thumbnail; or, in response to a long press operation on any thumbnail, generating an operation option for the thumbnail; or, in response to the virtual object penetrating any thumbnail in a direction away from the user, hiding the thumbnail; and in response to the virtual object moving in a direction close to the user to leave the thumbnail, restoring display of the thumbnail.

11. A non-transitory computer-readable storage medium, wherein a computer program is stored on the non-transitory computer-readable storage medium, and when the computer program is executed by one or more processors, the interactive method for light field display according to claim 1 is implemented.

12. A light field display, comprising a non-transitory memory and one or more processors, wherein a computer program is stored in the non-transitory memory, and when the computer program is executed by the one or more processors, the interactive method for light field display according to claim 1 is implemented.

13. A light field display system, comprising:
the light field display according to claim 12; and
an image acquisition device, connected to the light field display and is configured to acquire an interactive gesture.

14. A non-transitory computer-readable storage medium, wherein a computer program is stored on the non-transitory computer-readable storage medium, and when the computer program is executed by one or more processors, the interactive method for light field display according to claim 4 is implemented.

15. A light field display, comprising a non-transitory memory and one or more processors, wherein a computer program is stored in the non-transitory memory, and when the computer program is executed by the one or more processors, the interactive method for light field display according to claim 4 is implemented.

16. A light field display system, comprising:
the light field display according to claim 15; and
an image acquisition device, connected to the light field display and is configured to acquire an interactive gesture.

17. A light field display system, comprising a light field display and an image acquisition device, connected to the light field display and is configured to acquire an interactive gesture,
wherein the light field display comprises a memory and one or more processors, wherein a computer program is stored in the memory, and when the computer program is executed by the one or more processors, an interactive method for light field display is implemented, the method comprising:

creating a virtual object on a stereoscopic interactive interface displayed by a target light field display to map a user's interactive gesture on the stereoscopic interactive interface;

performing an interactive operation corresponding to the interactive gesture on a target object in the stereoscopic interactive interface, by recognizing the user's interactive gesture for the stereoscopic interactive interface and mapping the interactive gesture to the virtual object; and adjusting a display content of the stereoscopic interactive interface based on the interactive operation, wherein in a case that the light field display is a light field display with an optimal viewing distance exceeding a preset distance, the image acquisition device is installed at a top of the light field display, and a longitudinal field angle of the image acquisition device is set in a range of 90° to 120°, and an angle between a right ahead direction of the image acquisition device and a horizontal direction is set in a range of 45° to 60°; and in a case that the light field display is a light field display whose optimal viewing distance does not exceed a preset distance, the image acquisition device is installed at a bottom of the light field display, the longitudinal field angle of the image acquisition device is set in a range of 60° to 90°, and the angle between the right ahead direction of the image acquisition device and the horizontal direction is set by the following relationship:

$$\alpha = 90° - \frac{fov}{2} - \arctan\frac{l}{h}$$

wherein, h represents a height of the light field display, α represents the angle between the right ahead direction of the image acquisition device and the horizontal direction, fov represents the longitudinal field of view of the image acquisition device, and l represents the optimal viewing distance.

* * * * *